Aug. 9, 1960 A. F. KIESER 2,948,510
PORTABLE CABLE PULLER AND POWER UNIT
Filed Dec. 10, 1953 6 Sheets-Sheet 2

Inventor
Alvin F. Kieser
By Munn, Liddy, Glaccum & Rich
Attys.

ated Aug. 9, 1960

United States Patent Office

2,948,510
PORTABLE CABLE PULLER AND POWER UNIT
Alwin F. Kieser, 88 Alhambra Road, Massapequa, N.Y.

Filed Dec. 10, 1953, Ser. No. 397,375

4 Claims. (Cl. 254—139.1)

This invention relates to portable cable puller and power unit means and boom structures used therewith.

It is an object of this invention to provide a cable puller and power unit which can be readily moved about to desired locations of use and which, while portable and light in weight, is capable of heavy duty. It is a further object of this invention to provide apparatus of the character described which is adaptable to a great variety of different operating conditions and which can be readily adapted for efficient service under unusual and otherwise very difficult conditions.

Certain more specific objects of my invention are to provide a portable power unit for use as a transmission cable puller, a hoist and as a general power drive unit adapted to meet all the problems of pulling or drawing cable such as in conduits and ducts, hoisting heavy loads such as reels of cables and the like, moving and setting heavy equipment and machinery, in building construction work, also to provide a take-off for driving pipe cutting and threading machines, to brake cables when dropping feeders from upper floors of a building and many other uses that require careful, easily controlled and safe power application.

Another object of my invention is to provide a device for the purposes stated which comprises a demountable boom structure having such features of relative adjustability of parts comprised therein including a sheave rotatably mounted thereon to provide a correlation between boom length and location of the sheave relative to the longitudinal extent of the boom, as well as the angular disposition of the boom, whereby the boom may be positioned in firm relation to supporting means therefor while at the same time disposing the sheave in position for obtaining maximum efficiency and structural stability in relation to the direction in which cable pull is to be exerted by the device from the source of power comprised therein regardless of wide variation in the nature of available supporting means and the direction in which the cable pull is to be exerted and the location of the point at which such pull is to be exerted.

Further objects and features of preferred boom structure embodying this invention relate to the provision of a boom comprising a plurality of sections which are relatively extensible longitudinally and readily releasable means for holding the sections in different positions of adjusted extensibility and, further in combination therewith, sheave mounting means adjustably securable by readily releasable securing means whereby the sheave may be adjusted relatively to the longitudinal extent of the boom which, as stated, is such as to be longitudinally extensible as well as tiltable and demountable. Further objects and features of the invention relate to the structural member nature and relationship of parts comprised in the boom structure whereby very great strength against transverse bending loads is achieved notwithstanding lightness in weight, such strength being capable of being increased under certain conditions by virtue of the manner and extent of overlap of sections comprised in the boom structure. Still further features of preferred embodiments relate to the construction of the side bar means of the boom sections and of means for attaching sheave holders in readily adjustable relation thereto, including such attachment thereto in the region of overlap between sections of the boom structure.

Another object of my invention is to provide a boom structure of the character aforesaid demountably or otherwise pivotally secured to a base which preferably has readily demountable wheels so that the device may be readily transported and likewise, by removal of the wheels, will become anchored and stay in the position in which it is located. The base supports a motor-driven drawing or hoisting cable-winding drum onto which cable may be drawn under tension applied over the sheave comprised in the boom structure. Preferably, the device comprises a change speed transmission providing different torques of high gear reduction for operating the winding drum from the motor.

A further object is to provide brake means for checking or holding the load in any position desired during the pulling, lifting or lowering thereof, the drive being reversible and the motor being electrically driven and controlled by a safety switch which shuts off the motor when the brake is applied and starts the motor when the brake is released, and a reversing switch for the motor to reverse the rotation of the drum to wind or unwind the cable, the free end of which operates around a sheave adjustably mounted on the boom.

A further object is to provide conveniently located levers for operating the brake and simultaneously closing or opening the motor controlling switch, and for shifting the speed change or power transmission drive gears depending upon the power required for handling a load which is to be hoisted or lowered.

The above and other objects I obtain in a compact portable machine of comparatively small size and light weight which permits the performance of various jobs of the kind stated with little manual effort and a saving of time and cost, as well as eliminating the necessity of extensive rigging or overmanning for those temporary demands for power service in general construction work.

Further objects, features and advantages of this invention will be apparent from the following description of certain typical embodiments thereof which have been shown for illustrative purposes in the accompanying drawings, wherein.

Similar reference numerals, in the several figures, indicate similar parts.

The portable power unit of the present invention comprises a wheel supported base 10 comprising a rectangular frame having parallel side bars 11 connected by any suitable number of transverse members or spacers 12 over which may be arranged a removable housing 13. The base or frame is provided near one end with axle spindles 14 projecting from the sides on which wheels 15 are detachably mounted and at the other end with a vertical bearing 16 for a detachable swiveled wheel or caster 17 whereby the device may be transported or moved and steered about to a desired operational location. The wheels when removed allow the base to set firmly and be thus anchored.

Mounted upon the base 10, as by a horizontal cross member, or shelf 18, is a reversible electric motor 19 to which a current supply cable 20 is connected through a junction box 21, a main reversing switch 22, having an operating handle 23, and an off and on starting switch 24 having a control operating arm 25. The motor shaft 26 has a small pinion or spur gear 27 fixed thereto in mesh with a larger gear 28 fixed to a transverse horizontal shaft 29 journaled in bearings 30 on the side members 11 of the base or frame 10. The shaft 29 also has fixed thereto a long pinion 31 which may be made up by using three small pinions. Pinion 31 meshes with a large gear 32 fixed to a second but slidable or axially shiftable horizontal shaft 33 journaled in corresponding bearings 30a and with its end 34 projecting outwardly of the bearings to allow the necessary sliding movements.

Shaft 33 also has a small pinion 35 fixed thereto which in one position of the shaft meshes with a large gear 36 fixed to a third horizontal shaft 37 journaled in similar bearings 30b and having a square projecting end 38 for service as a power drive or take-off for operating other machines such as a pipe cutter or a threading machine. A small pinion 39 is fixed on shaft 37 and meshes with a large gear 40 fixed to a cable-winding drum 41 rotatable on or fixed to a shaft 42 mounted in bearing brackets or pillow blocks 43 fixed on the side members 11 of the machine frame, whereby the drum may be driven at a comparatively low speed. In order to drive the drum at a higher speed an intermediate sized pinion 44 is also fixed to shaft 33 to shift therewith to mesh with a larger pinion or gear 45, also fixed to shaft 37, when pinion 35 is disengaged from gear 36.

In order to operate the speed change or transmission gear drive by shifting shaft 33, an operating lever 46 has its lower end fixed to a collar 47 free on shaft 33 between a pair of collars 48, pinned or otherwise keyed or fixed to shaft 33, so that the shaft may be axially shifted to either of the above described positions. The lever 46 extends upwardly through a slot in the casing 13 and is adapted to be thrown into and out of engagement with one or another of a plurality of notches 49 in one edge of a transverse horizontal locking bar 50 extending between the top sides of the frame or casing. As the lever is shifted the shaft 33 slides axially and by engaging the lever in the proper notch it may be locked with either pinion 35 or 44 in mesh with their respective gear wheels. A spring 51 between the lever 46 and bar 50 holds the lever in the selected notch.

A brake drum 52 is fixed to the shaft 37, preferably outwardly from pinion 39, and a brake band 53 is mounted thereon with its ends provided with a linkage or toggle connection 54 to ears 55 on said ends. This connection may consist of angle bolts 56 adjustably connected to the ears and connected by a link 57 to which the lower end of an operating lever 58 is rigidly connected to contract the band on the drum or expand and release the band. The lever is normally held in braking position by a spring 59 extending between the lever and bar 50. The off and on control switch 25 for the motor circuit is arranged to operate conjointly with the brake lever. It is located in alignment with the brake drum within the machine frame at the rear end thereof and its operating arm 25 is held in the off position to stop the motor 19 by a connecting rod 61 extending rearwardly from the lever 58. In this manner, the motor is stopped, as a safety feature, when the brake is applied to lock the hoisting cable drum 41, thus holding the cable 60 under tension. When the lever 58 is operated in the opposite direction to release the brake band, the switch 24 is moved to the "on" position to start the motor and drive the drum through the transmission gearing. A resilient means or spring 62 may be interposed in the connection of the lever 58 with the switch arm 25, between the latter and adjacent end of connecting rod 61 to compensate for any variance in the operation of the switch and brake and wear on the parts and introduce an element of safety in the operation.

The frame or casing may be reinforced by corner gussets or webs 63 and also by cross braces or channel members 64.

Figures 8, 9:
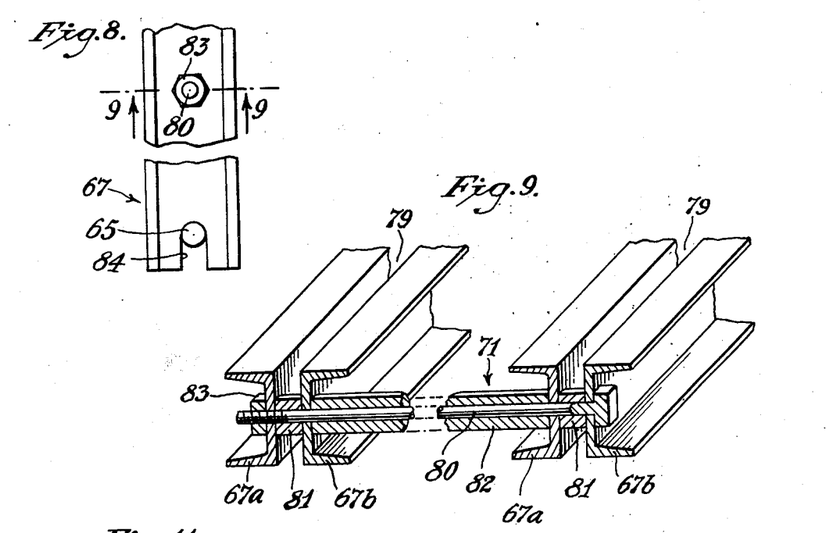
Fig. 8 is a side elevation on a larger scale of the lower end of the boom shown in Fig. 1.
Fig. 9 is a perspective view on an enlarged scale of the boom structure taken from the section along the line 9—9 of Fig. 8.

The angle brackets or pillow blocks 43 are each provided with pivot pins 65 above the axis of the drum 41, thereby forming a horizontal pivot for an adjustable boom which as a whole is indicated by the reference character 66, and which comprises a lower section 67 and an upper section 68, the sections 67 and 68 being adjustably disposed in relatively extensible longitudinally overlapping relation. The construction of the sections 67 and 68 is essentially the same and is illustrated in greater detail in Figs. 8 and 9 which illustrate the construction with reference to the boom section 67. As shown in Fig. 9, the section 67 comprises side bar means which are disposed in substantially parallel spaced relation and which are connected by cross pieces that are indicated generally by the reference character 71. Each of the side bar means is composed of two U-shaped channel bars 67a and 67b disposed with their back surfaces in opposed proximate spaced relation leaving the longitudinally extending passage 79 therebetween, the passage 79 being normal to the plane of the boom section. The construction of the cross pieces 71 is such as to maintain the spacing between the channel bars 67a and 67b and such as to maintain the spacing between the side bar means of the boom section. As illustrated in Fig. 9, the tie bolt 80 extends through the central portions of the channel bars 67a and 67b and between these channel bars which are comprised in each of the side bar means there is a spacer 81. For maintaining the desired spacing between the side bar means there is a central spacer 82. The entire structure may be held in rigidly assembled relation by tightening down the nut 83 on the bolt 80. The number of cross pieces 71 may be such as to provide the spacing that results in desired characteristics of each boom section. As above stated, the boom sections 67 and 68 are of identical construction. However, the boom section 67 is the only one which need be supplied with means coacting with the pivot pin 65. Preferably, such means coacting with the pivot pin 65 consists of a recess 84 in the lower end of each of the channel bars 67a and 67b as indicated in Fig. 8. When a recess such as the recess 84 is used, it is apparent that the boom may be removed very readily from the base 10. As will be mentioned hereinbelow, such removability is desirable under certain conditions.

Since the boom sections 67 and 68 are substantially identical, it is apparent that they are capable of being disposed with the side bar means in longitudinally overlapping relation and that the amount of overlap may be varied as desired. Any setting of relative extensibility of the boom sections 67 and 68 may be selected as desired and this is important in providing flexibility for meeting different conditions in using the device of this invention. The boom sections 67 and 68 may be rigidly held in any desired position of adjusted longitudinal extensibility by suitable clamping means. In the embodiment shown this clamping means consists of the U-bolts or clips 69 and plates 70 which are fastened around the overlapping portions of the boom sections and which, upon tightening of the U-bolts, are adapted to hold the boom sections in very firmly secured position.

In connection with the foregoing, attention is called to the fact that the boom structure above described provides very great strength notwithstanding the use of parts which are relatively light in weight. Thus, each side arm of the boom structure comprises two channel bars which are disposed so that very great resistance is provided to loads imposed normally to the planes of the boom sections. Moreover, very great resistance to compresseive strains imposed longitudinally is provided. In addition, by using boom sections constructed as above described which are of the same width so that the overlapping portion of the side arm means of one boom section overlies the side arm means of another boom section as shown, the centrally disposed portion of the boom structure, which for most uses has the greatest amount of strain imposed thereon, is caused to possess extremely great strength. As regards loads imposed normally to the plane of the boom sections, it is apparent that the central portion of the boom comprises four channel bars whose composite effective thickness in the direction of such loads is twice the width of the bottom portion of the channel bars. In this way very great resistance is provided to bending under the heavy loads which may be imposed normally to the boom and also great resistance is provided against buckling under loads imposed in the longitudinal direction of the boom. As will be described hereinbelow, additional boom sections may also be built up so as to further increase the overall strength of the boom while using parts which are inherently of light weight construction.

Figures 1, 2:
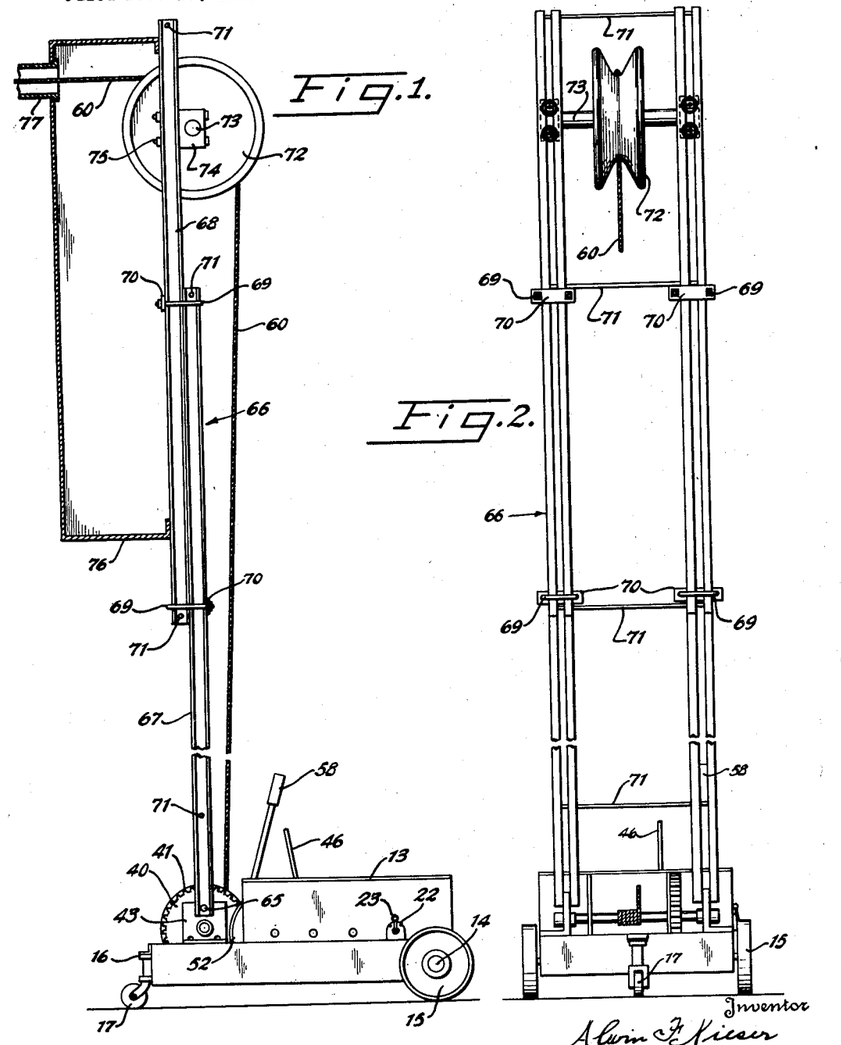
Fig. 1 is a side elevation of a portable power unit embodying my invention shown in use in pulling a transmission or communication cable horizontally.
Fig. 2 is a front elevation of the device or machine shown in Fig. 1.
Figures 3, 6, 7:
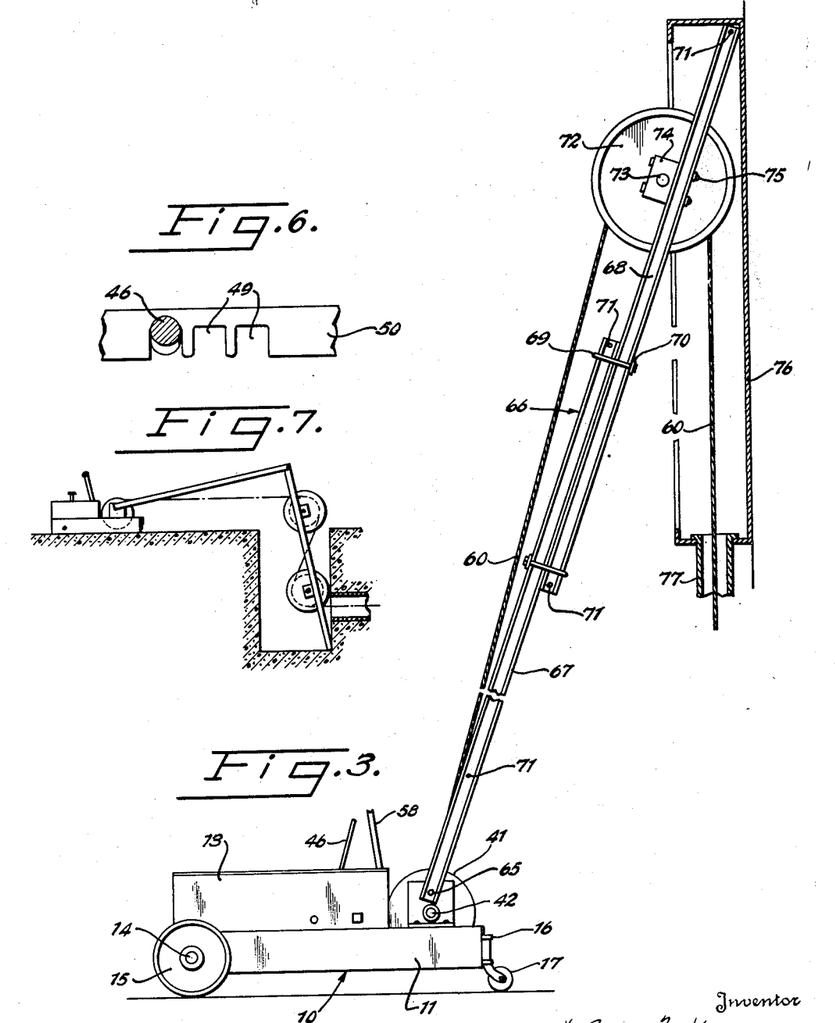
Fig. 3 is a side elevation of the machine rigged for hoisting.
Fig. 6 is a fragmentary detail section taken on the line 6—6 of Fig. 5 showing the means for holding the gear shift lever in different speed change positions.
Fig. 7 is a diagrammatic view illustrating the use of the machine in a position other than that shown in Figs. 1 and 3.
Figure 4:
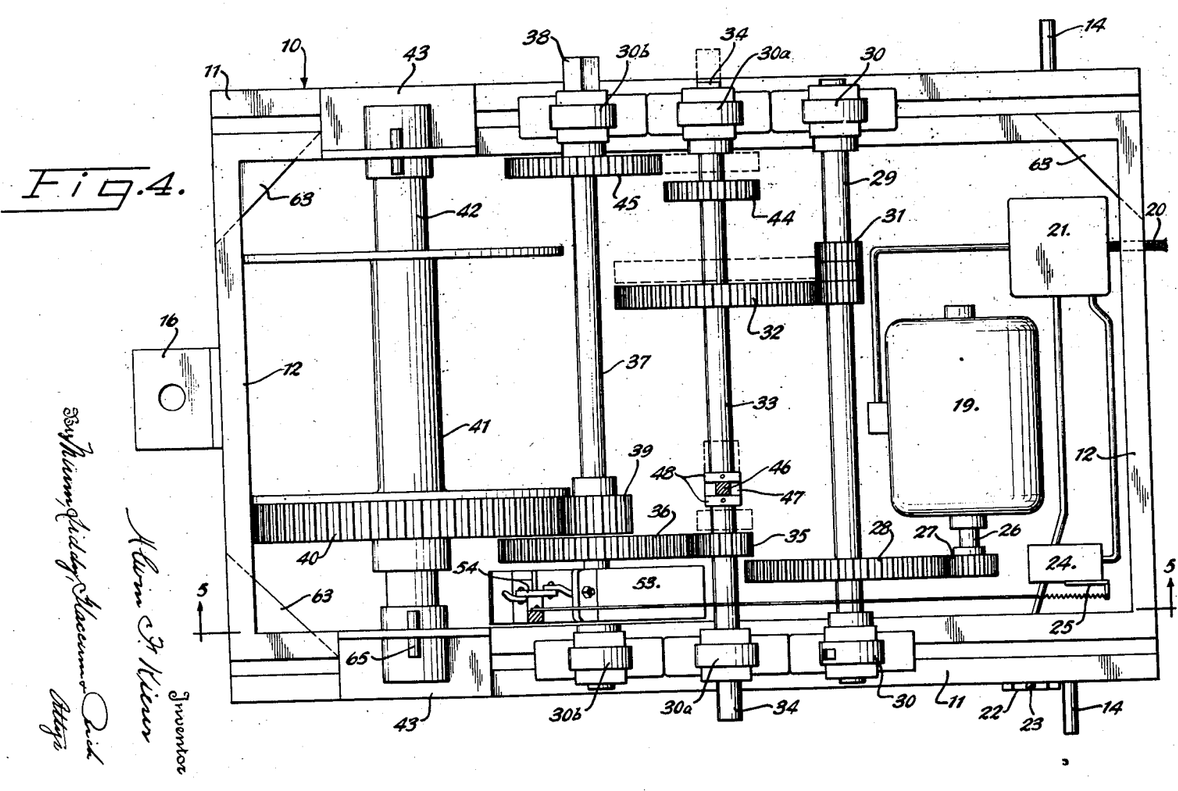
Fig. 4 is an enlarged top plan view of the base and driving mechanism, with the top of the casing and transporting wheels removed.
Figure 5:
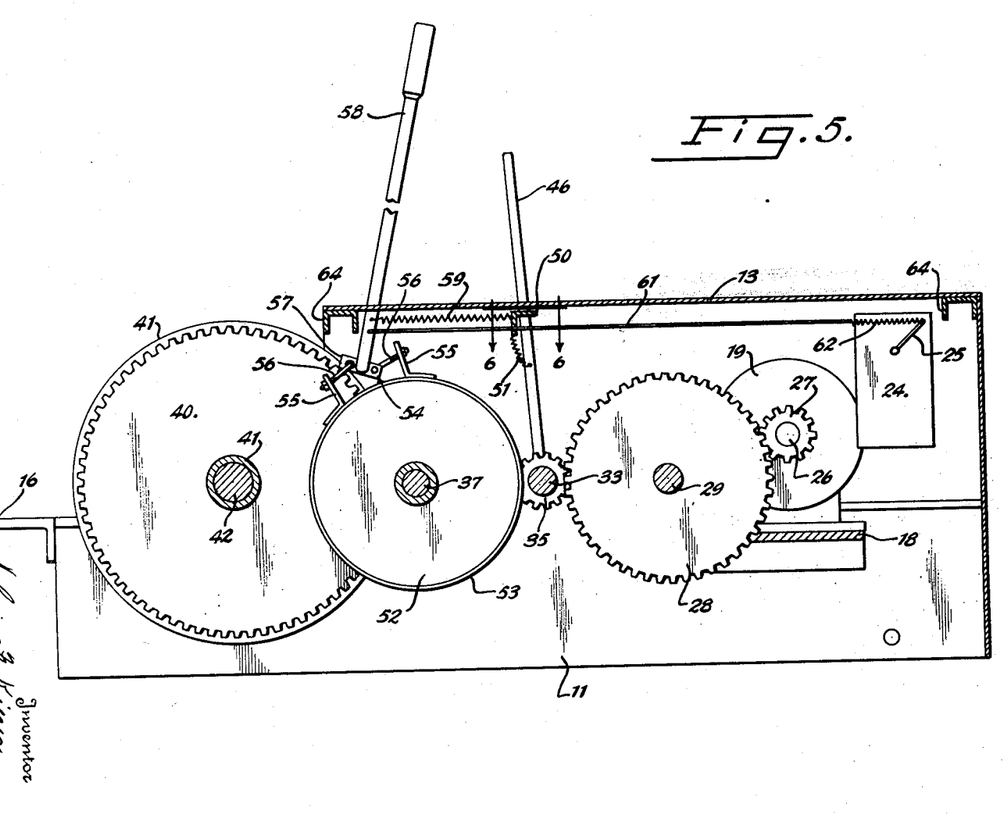
Fig. 5 is a vertical longitudinal sectional view taken on the line 5—5 of Fig. 4.
Figure 10:
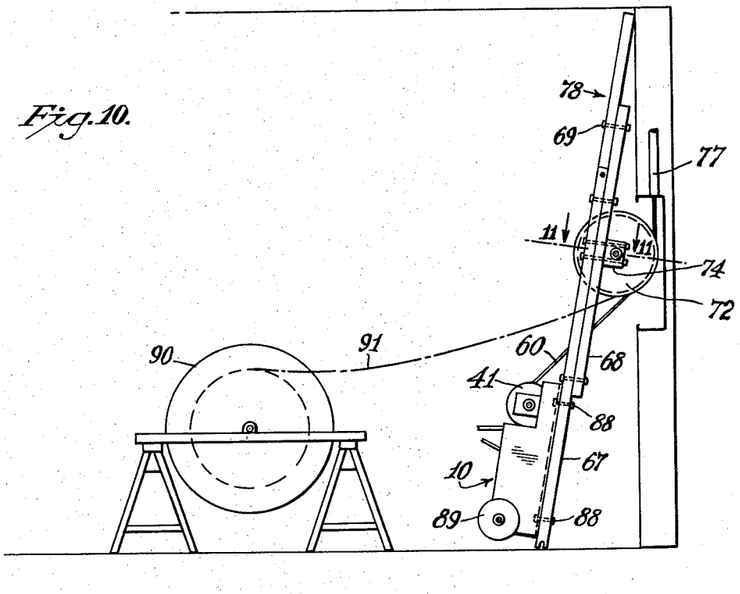
Fig. 10 is a side elevation of another embodiment of this invention showing an alternative manner of relative mounting of the boom and power unit, the device being in position for pulling a wire downwardly from a panel, or for alternatively using the boom structure for feeding a wire upwardly.
Figure 11:
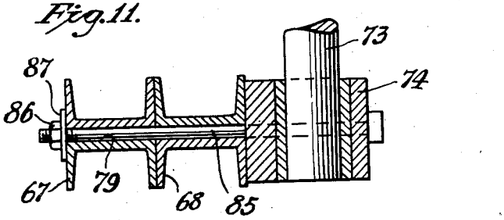
Fig. 11 is a section on an enlarged scale taken on the line 11—11 of Fig. 10.

There may be mounted on the boom one or more sheaves around which the hoisting or pulling cable may be trained. It is one of the features of this invention that the sheave may be adjustably positioned along the longitudinal extent of the boom and on either side of the boom so as to provide the aforesaid correlation between the extensibility of the boom as a whole and the position of the sheave in relation to the boom length regardless of the boom length adjustment for the particular job in hand. In the embodiment shown in Figs. 1, 2 and 3 a single sheave is shown secured to the boom section 68. In Fig. 10 a sheave is shown attached to the other side of the boom in the region thereof where the boom sections 67 and 68 overlap. The sheave 72 is carried by the short shaft 73 which is rotatably mounted in the pair of bearings or sheave-holding parts 74. One of the parts 74 is adapted to rest on the flanges presented on each side of the boom where they provide exterior surfaces. Either the parts or the mountings therefor, as the case may be, are wider than the longitudinal passage 79 between the channel bars of each side bar means. In order to hold the sheave-holding parts 74 in place the bolts 85 pass therethrough and through the passage 79 between the channel bars 67a and 67b of the side bar means of the boom section 67 or the corresponding channel bars of the boom section 68. In Fig. 10 the sheave-holding parts 74 are shown attached to the region of the boom where the boom sections 67 and 68 overlap and for such positioning the bolts 85 are sufficiently long so as to pass through both of the sections 67 and 68 so that the bolts 85 may be tightened down by means of the nuts 86 which bear against the washers 87 that bridge the passage 79, as shown in greater detail in Fig. 11. If the sheave-holding parts 74 are attached to either of the boom sections 67 or 68 in a region other than that of the overlap as illustrated in Figs. 1, 2 and 3, then shorter bolts 85 may be used or, alternatively, the nut 86 could be advanced so as to be adapted for drawing the bolts 85 into position for firmly holding the parts 74. In either case it is to be noted that the bolts 85 pass through the longitudinally extending passage 79 in each of the side arms, with the result that the sheave-holding parts 74 can be adjusted longitudinally along the boom for securement in different positions of adjustability in relation to the longitudinal extent of the boom.

By virtue of the construction above described, great versatility is afforded whereby efficient pulling and hoisting operations may be carried out under a great variety of different conditions. As above mentioned, Figs. 1 and 2 illustrate one possible positioning of the parts which is adapted for the pulling of a transmission or communication cable through a horizontally disposed conduit. It is to be noted that the boom can have its length adjusted so that it may be disposed in an efficient position between the floor and ceiling. Moreover, the sheave may be located so that the cable will be in exact alignment with the conduit 77. It is to be noted that the sheave in these figures is adjacent to where the top of the boom rests against a support. The boom rests against the support further down in the region of the overlap between the boom sections 67 and 68, thus providing enhanced strength in the stretch between the lower margin of the panel box 76 or the like and the sheave, which is substantially longer than the stretch between the sheave and the point where the boom is supported adjacent the upper end. In Fig. 3 the device is shown in use for pulling a transmission cable vertically upward or lowering it downwardly from a panel 76 through conduit 77 arranged against or adjacent a wall or otherwise. Here again it may be noted that the boom can have its length adjusted so that its upper end will come within the panel box 76 while the angle that the boom makes with the vertical is such as to provide strength for efficiently carrying the vertically imposed load, and that when the boom is thus adjusted the sheave likewise is adjustable relative to the boom so that the cable is in exact alignment with the center of the conduit 77. It is also to be noted that the overlap between the boom sections is so located as to provide enhanced strength for the region in the overall boom length where the load imposed is most likely to cause bending or buckling.

In Fig. 10 the boom structure is shown in use for pulling a transmission cable or the like vertically downwardly through a vertically disposed conduit 77. This figure also illustrates a different mode of attachment of the power unit to the boom structure. When the device is being used to pull a transmission cable downwardly, the force applied to the device tends to raise it upwardly and the boom should be of sufficient length so that it may be braced against the ceiling. While this might be accomplished by extending the overall length of the boom by reducing the amount of overlap between boom sections 67 and 68, Fig. 10 illustrates the employment of an additional boom section 78 which overlaps with the boom section 68. When the power unit is attached to the boom in the manner shown in Fig. 10, the bottom of the boom and the top of the boom may be wedged between the floor and ceiling respectively and the boom section 68 provides a very high degree of strength in the central portion of the boom. The sheave 72 is attached to this portion of the boom and because of its adjustability it can be located so that the cable which is trained over the sheave may be disposed in exact alignment with the conduit 77.

In Fig. 10 the boom rests directly on the floor instead of on the pivot pins 65 and the power unit is shown attached to the boom section 67. This may be accomplished by the clamps 88. When the power unit 10 is thus attached to the boom section 67 the cable 60 may be trained from the winding drum 41 over the sheave 72 as shown. In the embodiment as shown in Fig. 10 wheels 89 are shown attached adjacent the lower corner of the power unit 10 that is furthest removed from the boom section 67. When the device is in the position shown in Fig. 10, the wheels 89 do not rest on the floor and the end of the boom is wedged against the floor. However, by tilting the device in the direction opposite to the inclination shown in Fig. 10 the wheels 89 may be caused to contact the floor and the entire device may be wheeled along in a manner similar to the use of a hand truck. For relatively light weight apparatus this arrangement is very convenient for the entire unit can be wheeled along very easily and can be set up in place, as illustrated in Fig. 10, without removing the wheels 89. For larger and heavier units the construction shown in Figs. 1, 2 and 3 is normally to be preferred.

Fig. 10 also illustrates the utility of the boom structure in the feeding of wires or cables as distinguished from performing a pulling operation. When a cable is being drawn through a conduit a corresponding amount of cable or wire to be put in place in the conduit has to be fed in at the other end. If the feeding is unaided, workmen have to guide the cable or wire into the conduit. However, if the boom construction is positioned as shown in Fig. 10 or in Figs. 1, 2 and 3, the sheave may be used as a guide for feeding cable or wire rather than pulling it. In Fig. 10 a reel 90 of wire, cable or the like is shown from which the wire or cable 91, which is shown in dotted lines in Fig. 10, may be trained so that it goes over the sheave 72 and into the conduit. When the boom structure is thus used in the feeding of a wire or cable the power unit need not be employed and, with the parts as shown in Fig. 10, the power unit 10 could be removed altogether. When the embodiment shown in Figs. 1, 2 3 and 8 is employed, it is apparent that the boom structure is readily demountable so that it can be used by itself for cable or wire feeding in the manner illustrated above.

Figure 12:
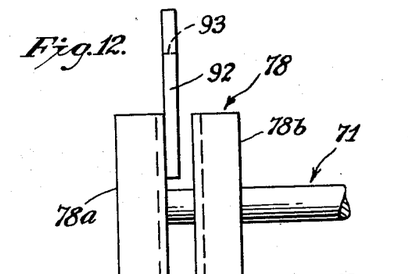
Fig. 12 is a front elevation of the top end of one side bar means of a boom section having a plate extension adapted for effecting angular disposition of boom sections.
Figure 13:
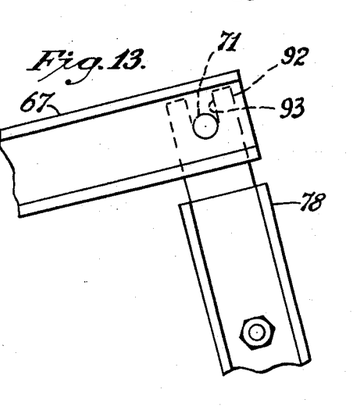
Fig. 13 is a side view of the angular joint between the boom sections shown in Fig. 7 utilizing the extension plate shown in Fig. 12.

An attachment to a boom section is illustrated in Figs. 12 and 13 which is useful under conditions such as those illustrated by Fig. 7. In certain instances it is desirable that the boom sections be jointed so that they may be arranged as shown in the diagrammatic illustration Fig. 7, which shows the device being used as a street manhole for drawing a transmission cable through an underground conduit, two sheaves being used for training the pulling cable thereover in the positions shown. In such case the jointed connection between the boom sections may be provided by using a boom section 78 having a plate 92 attached to one of the channel bars 78a and 78b so as to extend from the end of the boom section 78. The plate 92 has a notch 93 in the end thereof which is adapted to receive the portion of the cross piece 71 in the region of the passage 79 between the channel bars 67a and 67b of the boom section 67. In this way a firm joint is provided when the boom sections are disposed in the position shown in Fig. 7. The notch 93 is also adapted to coact with the portion of the cross piece 71 in the region of the passage 79 if the boom sections 67 and 78 are disposed end to end as shown in Fig. 10, thereby affording greater strength. However, when the parts are disposed in the position shown in Fig. 10, it is not necessary for the boom sections 67 and 78 to be in abutting relation for each independently may be secured to the intermediate boom section 68.

Figure 14:
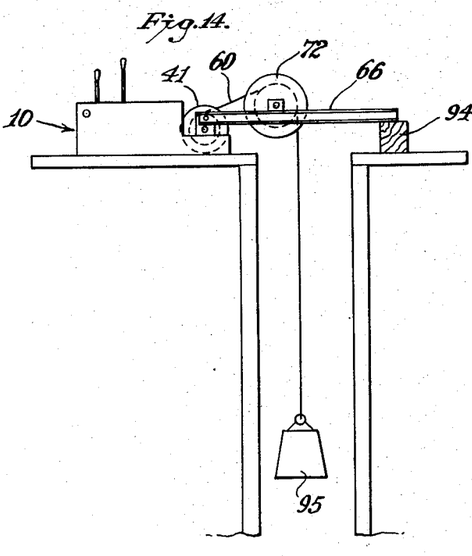
Fig. 14 is side elevation of the device shown in Fig. 1 with the parts disposed for lifting a load from a declivity.

It is believed to be apparent from the foregoing that various heavy loads may be hoisted or lowered as when lowering feeder cables from upper floors of a building, and the device may also be used for other purposes and in different arrangements requiring careful control and safe power application whereby the load can be held and supported at any desired point or elevation. One further application of the device is illustrated in Fig. 14. As shown in this figure, the boom 66 straddles a declivity, one end being supported by the power unit or base 10 and the other end being supported by a support block 94. The cable 60 is trained over the sheave 72 so that it may be used for raising or lowering a load 95 in the declivity.

In practical use the device of this invention is such that it can be readily brought to the location where it is to be used and the length of the boom, the dispersion of the boom and the location of the sheave on the boom are adjusted according to the particular conditions of use. If the device is of the type shown in Figs. 1, 2 and 3, the wheels are removed from the base so that it will remain immovable in position on the floor. If the device is of the type shown in Fig. 10, the wheels may be separated from the floor by the position of the device as shown and it is not necessary to remove the wheels. After the boom and sheave have been adjusted relative to each other and to the conditions encountered, the cable 60 which is wound on the drum 41 is trained over the sheave 72 and connected to the part to be pulled, hoisted or lowered as the case may be. The handle 23 of the switch 22 is then set for rotation of the motor 19 in the proper direction to wind or unwind the cable. The lever 58 is then moved to release the brake and start the motor after the lever 46 is set to shift shaft 33 either with pinion 35 in mesh with gear 36 to drive the drum through gears 27 and 28, 31 and 32, and 39 and 40, or through pinion 44 and gear 45 at a higher speed. When gears 35 and 36 are engaged, gears 44 and 45 are disengaged and vice versa, and by operating the lever 58 to apply the brake, the switch 24 is opened to stop the motor and when the lever 58 is moved in the opposite direction to release the brake, the switch 24 is closed to start the motor 19 and wind or unwind the cable with respect to the drum 41 and either hoist or lower a load. The device can be conveniently manipulated with the minimum labor in moving it about and performing a particular job.

While the device may be made in various sizes and capacities, it may, for example, employ a ½ hp. single phase A.C. capacitor motor with a speed of 1750 r.p.m. operated from a 110–120 volt circuit to which it may be plugged in at cable 20 or run from a separate generator. The drum may be operated at speeds of 3 or 7½ r.p.m. or otherwise and will operate the hoisting cable at an average speed of 3½ to 10 feet per minute. It will safely lift one ton at high speed or 2½ tons at low speed by shifting the change speed gearing or transmission as described and when the brake is applied the load may be safely held in addition to cutting off and stopping the drive motor as described.

This application is a continuation-in-part of my application Ser. No. 65,185, filed December 14, 1948 now abandoned.

I claim:

1. A boom structure comprising a plurality of sections, each section comprising substantially parallel spaced side bar means connected by cross pieces, each of said side bar means comprising a pair of channel bars disposed with their back surfaces in opposed proximate spaced relation leaving a longitudinally extending passage therebetween disposed normally to the plane of the section and having flanges disposed substantially parallel to the section, the spacing of said side bar means being substantially the same in each of said sections, and said sections being disposed in relatively extensible, longitudinally overlapping relation whereby the said passages between said channel bars are in registration in the region of the overlap, securing means in fixed relation to said side bar means for securing said side bar means to said cross pieces in said parallel spaced relation and for securing said channel bars comprised in each of said side bar means with their back surfaces in said opposed spaced relation, readily releasable holding means movable longitudinally relatively to said side bar means and adapted to hold said sections rigidly together in any position of adjusted relative extensibility of said sections, a sheave, a pair of sheave-holding parts, each sheave-holding part of said pair being adapted to be placed in position adjustably along the external exposed surfaces presented by said flanges of said channel bars comprised in said side bar means along each margin of each of said sections, means for mounting said sheave for rotation between and relatively to said sheave-holding parts, and readily releasable securing means for rigidly securing said sheave-holding parts to said side bar means in said positions of adjustment relative thereto.

2. A boom structure according to claim 1 wherein said securing means for securing said sheave-holding parts to said side bar means comprises bolts which extend through the said longitudinally disposed passage in each of said side bar means and which are adapted to coact with said sheave-holding parts and said channel bars for holding said sheave-holding parts in contact with the external surfaces presented by said channel bar flanges for holding parts rigidly in said positions of adjustment relative to said side bar means.

3. A cable-pulling device comprising a power unit comprising a rigid frame and a boom having one end thereof mounted on said frame of said power unit, said power unit comprising cable-pulling means for pulling a flexible cable, said boom comprising a plurality of longitudinally aligned sections, each of which comprises substantially parallel side bar means connected by cross pieces and which are disposed in relatively extensible, contacting, overlapping relation, and means for holding said sections together in rigid relation in various positions of adjusted extensibility, a sheave, spaced sheave-holding parts, means for mounting said sheave for rotation relative to and between said sheave-holding parts, securing means for securing said sheave-holding parts respectively to said side bar means of each of said sections along opposite margins of said boom in various positions relative to the longitudinal extent thereof in substantially spaced relation to said end thereof, means for pivotally mounting said end of said boom on said frame of said power unit, said flexible cable extending linearly from said cable-pulling means and passing over said sheave, the axis of rotation of said rotatably mounted part being parallel with and adjacent to the pivotal axis of said boom whereby pull exerted on said cable imposes a load on said boom at said axis for pivotal movement of said boom in line with the longitudinal extent of said boom for different pivotal positions of said boom about said axis.

4. A cable-pulling device comprising a power unit comprising a frame, a substantially straight boom mounted on said frame of said power unit adjacent one end of said boom, and rotatably mounted wheels on said power unit for carrying said device, said wheels being readily removable whereby said power unit provides a stable base for said boom when said wheels are removed, said power unit comprising a driven rotatably mounted cable-winding drum, said boom comprising a plurality of longitudinally aligned sections, each of which comprises substantially parallel side bar means connected to cross pieces and disposed spaced apart by substantially the same distance in relatively extensible, contacting, overlapping relation, means for holding said bar members of said sections together in rigid relation in various positions of adjusted extensibility, a sheave, spaced sheave-holding parts, means for mounting said sheave for rotation relative to and between said sheave-holding parts, securing means for securing said sheave-holding parts to said side bar means of each of said sections along opposite margins of said boom in various positions relative to the longitudinal extent thereof including the region of the overlap of said bar members and on either side of said boom, and said boom being pivotally mounted on said frame for pivotal movement about an axis substantially parallel with and adjacent to the axis of said winding drum for passage of a flexible cable from said winding drum directly to said sheave.

References Cited in the file of this patent

UNITED STATES PATENTS

| | | |
|---|---|---|
| 401,225 | Smith | Apr. 9, 1889 |
| 963,417 | Brown | July 5, 1910 |
| 986,181 | Kraft et al. | Mar. 7, 1911 |
| 1,352,653 | Brown | Sept. 14, 1920 |
| 1,878,859 | Knabenshue | Sept. 20, 1932 |
| 1,893,408 | Goff | Jan. 3, 1933 |
| 1,913,439 | Francis | June 13, 1933 |
| 2,360,640 | Bengert | Oct. 17, 1944 |
| 2,413,909 | Clement et al. | Jan. 7, 1947 |
| 2,565,473 | Cline | Aug. 28, 1951 |
| 2,712,370 | Westfall | July 5, 1955 |

FOREIGN PATENTS

| | | |
|---|---|---|
| 178,616 | Canada | Aug. 7, 1917 |
| 680,462 | Great Britain | Oct. 8, 1952 |